G. T. WARREN, Sr.
FISH NET.
APPLICATION FILED AUG. 6, 1921.
1,420,396.
Patented June 20, 1922.
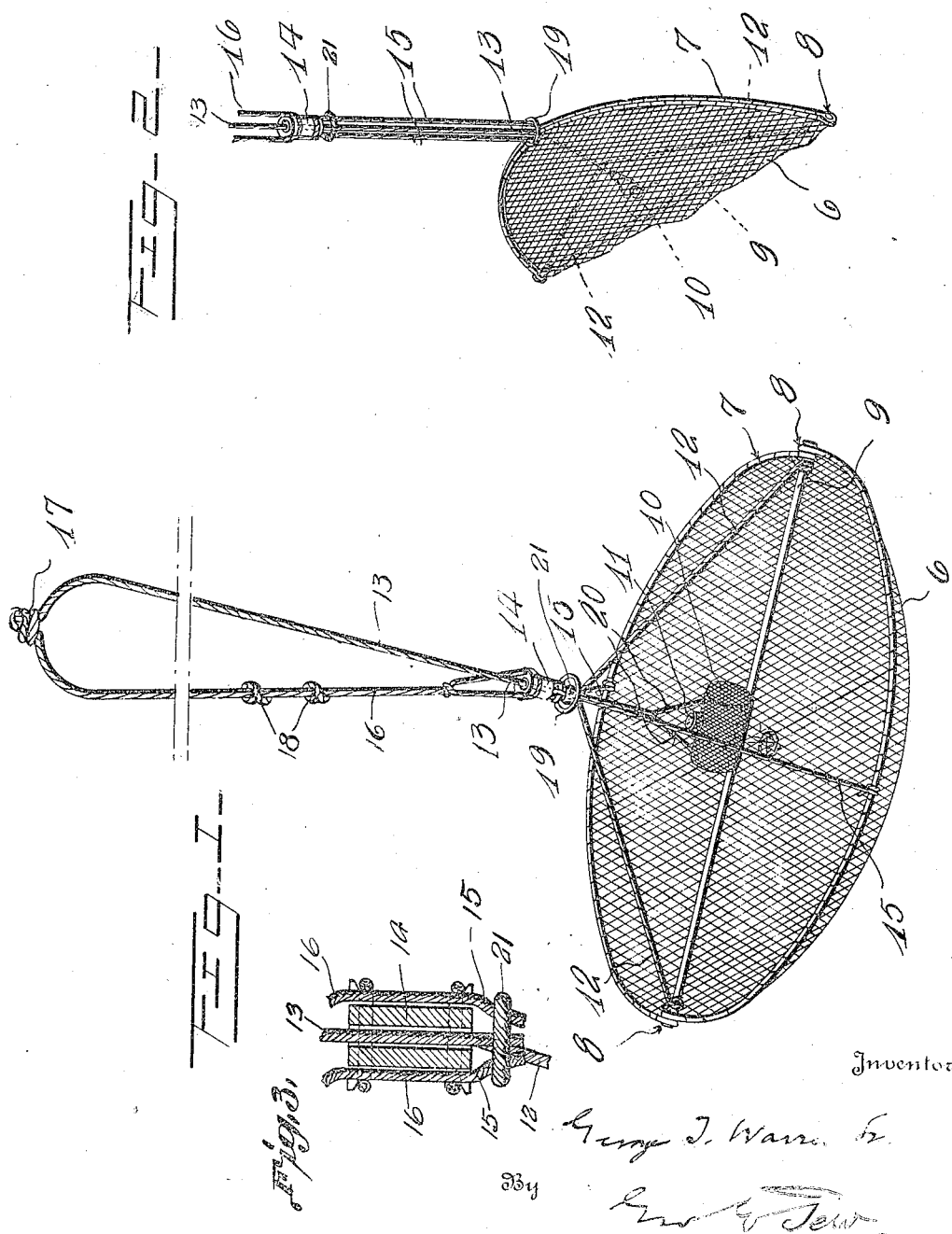

UNITED STATES PATENT OFFICE.

GEORGE THOMPSON WARREN, SR., OF CHARLESTON, SOUTH CAROLINA.

FISH NET.

1,420,396.　　　　Specification of Letters Patent.　Patented June 20, 1922.

Application filed August 6, 1921. Serial No. 490,236.

*To all whom it may concern:*

Be it known that I, GEORGE T. WARREN, Sr., a citizen of the United States, residing at Charleston, in the county of Charleston and State of South Carolina, have invented certain new and useful Improvements in Fish Nets, of which the following is a specification.

This invention relates to fish nets, and has for its object to provide an improved net particularly adapted for catching fish, crabs and the like, and characterized by improvements with respect to the means for opening and closing the net in order to trap the fish therein, the net being capable of being closed while under water, the same being manipulated by means of cords held by the fisherman.

The invention will be more clearly understood by reference to the following description and the accompanying drawings in which Fig. 1 is a perspective view of the net in open position. Fig. 2 is a similar view in closed position. Fig. 3 is a detail in section.

Referring specifically to the drawings, 6 indicates a circular net which is secured to a hoop or ring 7 made in two semi-circular sections, which are hinged together as indicated at 8 to a cross rod 9 which extends across the net. Secured to this rod 9 is a cage 10 for bait, having a removable stopper 11.

A pair of cords 12 extend from the ends of the rod 9 and are connected to a vertical rope or cord 13, which works through a spool 14, which runs up and down on said cord.

The spool is connected by a pair of cords 15 to opposite sides of the half rings or bows 7, so that when the spool 14 is pulled up the cords 15 will lift the opposite sides of the ring and close the same together at the top, as shown in Fig. 2. The spool 14 is connected to a pull rope 16 extending vertically, and this rope may for convenience be knotted to the upper end of the rope 13 as indicated at 17. The rope 16 may have a pair of knots 18, to give a finger hold and to assist in identifying the rope.

A loose ring 19 is mounted below the spool in position to run down on the cords 15 when said cords are pulled up, so as to lock the net in closed position, but when the net is lowered to open position this ring 19 will run up on the cords 15 to its normal position just below the spool 14. A binding 21 is placed around the cords below the spool.

The bait cage may be stayed by a pair of cords 20 connected thereto from the end of the cord 13, so as to hold the bait cage in upright position when the net is lowered.

In use, when the rope 16 is released the weight of the half rings 7 will cause them to open out and thus spread the net, which may then be lowered into the water and rest on the bottom, or be hung by the cords 12 and 13. To lift the net and trap the fish, the rope 16 is pulled. This runs the spool 14 up on the rope 13, and by pulling on the cords 15 the half rings 7 are folded or closed up together, thereby trapping the fish, and the whole net can then be lifted out of the water. The ring 19, at this action, runs down on the cords 15 and so prevents accidental opening of the net.

The device can be very quickly and easily manipulated and will be found very useful for the intended purpose.

I claim:

The combination of a net, a pair of half rings connected to the outer edge of said net, a hinge rod extending across the net to which the ends of the half rings are pivoted, a suspending rope connected to said hinge rod, a spool running on said rope, a pull rope connected to the spool, and cord connections between the spool and the opposite half rings and adapted to close the latter upwardly when the pull rope is pulled, and a bait cage mounted on the hinge rod.

In testimony whereof, I affix my signature in presence of two witnesses.

GEORGE THOMPSON WARREN, Sr.

Witnesses:
　WM. B. PARSONS,
　WM. P. CAMERON.